United States Patent
Huang

(10) Patent No.: US 12,004,064 B2
(45) Date of Patent: Jun. 4, 2024

(54) METHOD AND NON-TRANSITORY COMPUTER-READABLE STORAGE MEDIUM AND APPARATUS FOR RECEIVING BLUETOOTH PACKETS AND CORRECTING ERROR BITS THEREIN

(71) Applicant: Airoha Technology Corp., Hsinchu (TW)

(72) Inventor: Wen-Tsung Huang, Taipei (TW)

(73) Assignee: AIROHA TECHNOLOGY CORP., Hsinchu (TW)

(*) Notice: Subject to any disclaimer, the term of this patent is extended or adjusted under 35 U.S.C. 154(b) by 180 days.

(21) Appl. No.: 17/850,357

(22) Filed: Jun. 27, 2022

(65) Prior Publication Data

US 2023/0069016 A1    Mar. 2, 2023

Related U.S. Application Data

(60) Provisional application No. 63/237,658, filed on Aug. 27, 2021.

(30) Foreign Application Priority Data

Jan. 10, 2022   (CN) .......................... 202210021710.7

(51) Int. Cl.
*H04L 1/00*       (2006.01)
*H04W 4/80*       (2018.01)
*H04W 76/10*      (2018.01)

(52) U.S. Cl.
CPC ............. *H04W 4/80* (2018.02); *H04L 1/0045* (2013.01); *H04W 76/10* (2018.02)

(58) Field of Classification Search
CPC ...... H04W 4/80; H04W 76/10; H04L 1/0045; H04L 1/00
See application file for complete search history.

(56) References Cited

U.S. PATENT DOCUMENTS

2021/0058190 A1*  2/2021  Zopf ..................... H04L 1/0061
2021/0160673 A1*  5/2021  Girardier ................ H04W 4/80

OTHER PUBLICATIONS

English Translation of Taiwanese Search Report for Application No. 111100964 dated May 26, 2022.

* cited by examiner

*Primary Examiner* — Tuan H Nguyen
(74) *Attorney, Agent, or Firm* — Birch, Stewart, Kolasch & Birch, LLP

(57) ABSTRACT

The invention relates to a method, a non-transitory computer-readable storage medium, and an apparatus for receiving Bluetooth packets and correcting error bits therein. The method, which is performed by a processing unit, includes: receiving Bluetooth packets from radio frequency (RF) signal; verifying a unique synthesized packet with a first checksum thereof when the unique synthesized packet can be generated from the Bluetooth packets; generating synthesized packet candidates according to at least one inconsistent bit between the Bluetooth packets and verifying each synthesized packet candidate with a second checksum thereof when the unique synthesized packet cannot be generated from the Bluetooth packets; and transmitting a synthesized packet that has passed a verification to a program module for an application when the unique synthesized packet or any of the synthesized packet candidates passes the verification.

20 Claims, 7 Drawing Sheets

METHOD AND NON-TRANSITORY COMPUTER-READABLE STORAGE MEDIUM AND APPARATUS FOR RECEIVING BLUETOOTH PACKETS AND CORRECTING ERROR BITS THEREIN

CROSS-REFERENCE TO RELATED APPLICATIONS

This application claims the benefit of priority to U.S. Provisional Application Ser. No. 63/237,658, filed on Aug. 27, 2021; and Patent Application No. 202210021710.7, filed in China on Jan. 10, 2022; the entirety of which is incorporated herein by reference for all purposes.

BACKGROUND

The disclosure generally relates to wireless transmission and, more particularly, to a method, a non-transitory computer-readable storage medium and an apparatus for receiving Bluetooth packets and correcting error bits therein.

Bluetooth is a short-range wireless communications technology standard that is used for exchanging data between stationary and mobile devices over short distance using radio waves in the ISM bands, from 2.402 GHz to 2.48 GHz. Depending on packet type, individual packets may be protected by error correction, either 1/3 rate or 2/3 rate forward error correction (FEC). In addition, packets with cyclical redundant check (CRC) will be retransmitted until acknowledged by automatic repeat request (ARQ). How to speed up the error correction of Bluetooth packets has always been an important issue in the reception of Bluetooth packets. Therefore, it is desirable to have a method, a non-transitory computer-readable storage medium and apparatus for receiving Bluetooth packets and correcting error bits therein.

SUMMARY

The disclosure relates to an embodiment of a method for receiving Bluetooth packets and correcting error bits therein, performed by a processing unit, to include: receiving Bluetooth packets from radio frequency (RF) signal; verifying a unique synthesized packet with a first checksum thereof when the unique synthesized packet can be generated from the Bluetooth packets; generating synthesized packet candidates according to at least one inconsistent bit between the Bluetooth packets and verifying each synthesized packet candidate with a second checksum thereof when the unique synthesized packet cannot be generated from the Bluetooth packets; and transmitting a synthesized packet that has passed a verification to a program module for an application when the unique synthesized packet or any of the synthesized packet candidates passes the verification.

The disclosure further relates to an embodiment of a non-transitory computer-readable storage medium for receiving Bluetooth packets and correcting error bits therein when loaded and executed by a processing unit. The non-transitory computer-readable storage medium includes program code to: receive Bluetooth packets from RF signal; verify a unique synthesized packet with a first checksum thereof when the unique synthesized packet can be generated from the Bluetooth packets; generate synthesized packet candidates according to at least one inconsistent bit between the Bluetooth packets and verify each synthesized packet candidate with a second checksum thereof when the unique synthesized packet cannot be generated from the Bluetooth packets; and transmit a synthesized packet that has passed a verification to a program module for an application when the unique synthesized packet or any of the synthesized packet candidates passes the verification.

The disclosure further relates to an embodiment of an apparatus for receiving Bluetooth packets and correcting error bits therein to include a processing unit. The processing unit is arranged operably to: receive Bluetooth packets from RF signal through a RF module and a modulator-demodulator (modem); verify a unique synthesized packet with a first checksum thereof when the unique synthesized packet can be generated from the Bluetooth packets; generate synthesized packet candidates according to at least one inconsistent bit between the Bluetooth packets and verify each synthesized packet candidate with a second checksum thereof when the unique synthesized packet cannot be generated from the Bluetooth packets; transmit a synthesized packet that has passed a verification to a program module for an application when the unique synthesized packet or any of the synthesized packet candidates passes the verification; and activate a retransmission operation when none of the unique synthesized packet and the synthesized packet candidates passes the verification.

Both the foregoing general description and the following detailed description are examples and explanatory only, and are not restrictive of the invention as claimed.

DETAILED DESCRIPTION

Reference is made in detail to embodiments of the invention, which are illustrated in the accompanying drawings. The same reference numbers may be used throughout the drawings to refer to the same or like parts, components, or operations.

The present invention will be described with respect to particular embodiments and with reference to certain drawings, but the invention is not limited thereto and is only limited by the claims. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words described the relationship between elements should be interpreted in a like fashion (e.g., "between" versus "directly between," "adjacent" versus "directly adjacent." etc.)

Figure 1:
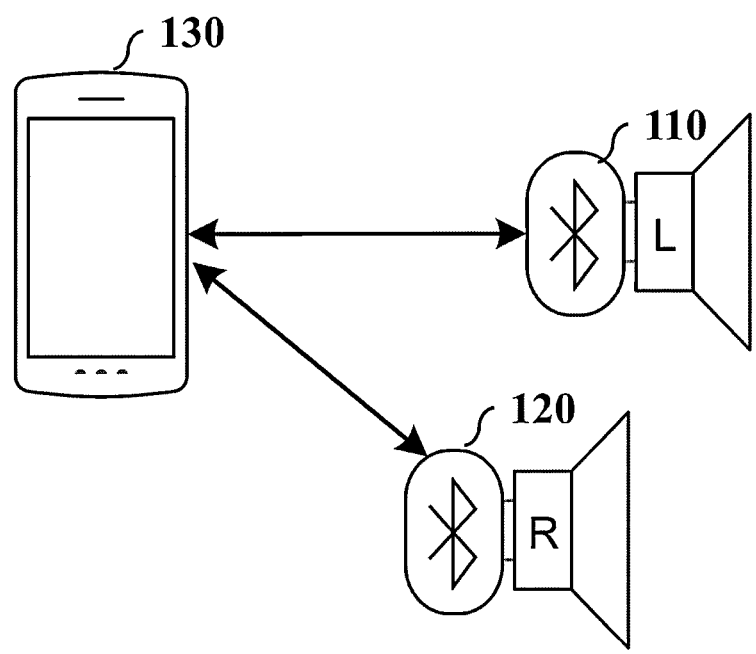
FIG. 1 is a schematic diagram of a Bluetooth communications application according to an embodiment of the present invention.

Refer to FIG. 1 showing an exemplary Bluetooth communications application. A user acquires data from the mobile phone 130 through wireless earbuds. The wireless earbuds are a pair of apparatuses with wireless communications capabilities, including a left wireless earbud 110 and a right wireless earbud 120, and no physical wire line is connected between the left wireless earbud 110 and the right wireless earbud 120. It may use a wireless communications protocol, such as Bluetooth low energy Audio (LE Audio) etc., to transfer packets carrying audio signals between the mobile phone 130 and the left wireless earbud 110 and between the mobile phone 130 and the right wireless earbud 120. In some embodiments, the left wireless earbud 110 and the right wireless earbud 120 may receive media packets including left channel and right channel of stereo data, respectively. The mobile phone 130 may be referred to as a wireless master device, while the left wireless earbud 110 and the right wireless earbud 120 may be referred to as wireless slave devices. The left wireless earbud 110 and the right wireless earbud 120 are peer devices for each other.

In addition to the aforementioned Bluetooth LE Audio, the embodiments of the present invention may also be applied to other Bluetooth communications technologies, such as Bluetooth Basic Rate (BR), Enhanced Data Rate (EDR), extended Synchronous Connection-Oriented (eSCO), etc. Moreover, the embodiments of the present invention may also be applied to other Bluetooth communications applications, such as peer-to-peer (P2P) data transmission between two electronic devices, or P2P data transmission between multiple electronic devices in a Personal Area Network (PAN), etc.

Figure 2:
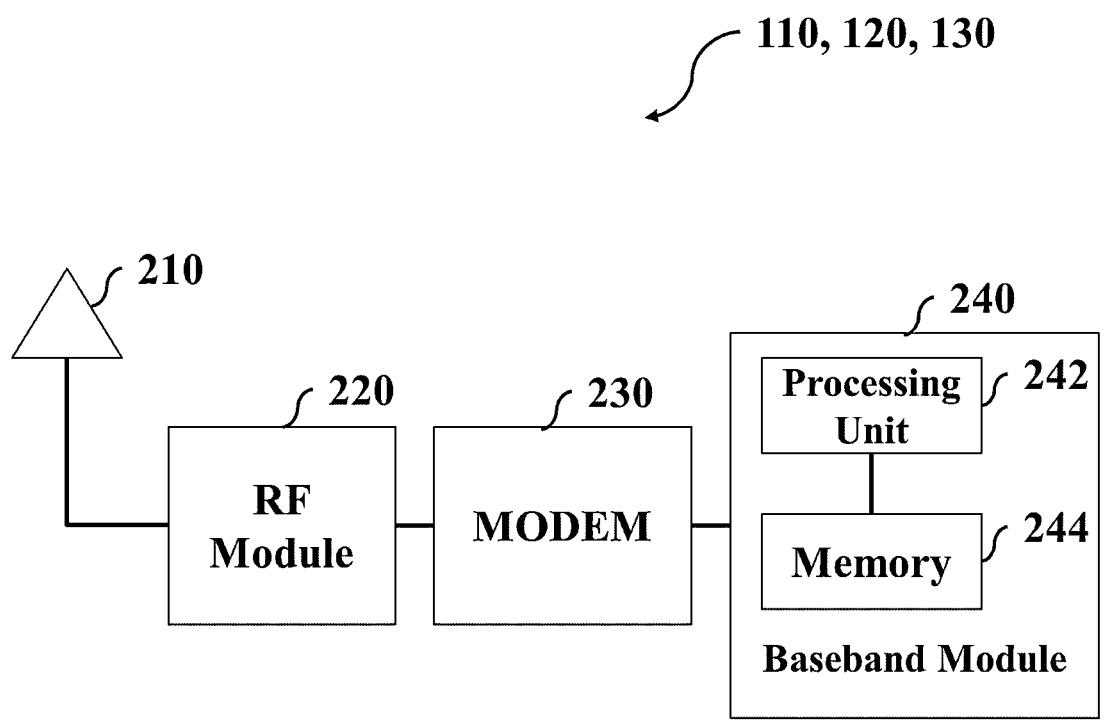
FIG. 2 is the system architecture installed in the left wireless earbud and the right wireless earbud according to an embodiment of the present invention.

Refer to FIG. 2 showing the system architecture. The system architecture may be implemented in the mobile phone 130, the left wireless earbud 110 or the right wireless earbud 120, and each includes the antenna 210, the radio frequency (RF) module 220, the modulator-demodulator (modem) 230 and the baseband module 240. The baseband module 240 includes the processing unit 242 and the memory 244. The processing unit 242 may be implemented in numerous ways, such as with general-purpose hardware (e.g., a microcontroller unit, a digital signal processor, a single processor, multiple processors or graphics processing units capable of parallel computations, or others) that is programmed using firmware and/or software instructions to perform the functions recited herein. The memory 244 may allocate space as a data buffer temporarily storing such as the control data, the media packet(s), etc. that has been obtained from the medium. The memory 244 may further store data needed during execution, such as variables, data tables, and so on. The processing unit 242 may couple the memory 244 to access data through a bus architecture.

In the BLE channel selection algorithm, the mobile phone 130 may send the same channel map or different channel maps to the left wireless earbud 110 and the right wireless earbud 120. The left wireless earbud 110 or the right wireless earbud 120 knows the specified one of the multiple physical channels (for example, 37) in the 2.4 to 2.48 GHz frequency band in each time interval (or time slot) to receive data or transmit data by using the designated hopping algorithm with the received channel map. The RF module 220 receives data or transmits data at the designated physical channel in each time interval. The RF module 220 is employed to receive RF signal in the medium and convert the received RF signal into baseband signal that can be processed by the MODEM 230. The RF module 220 is also employed to receive baseband signal from the MODEM 230 and convert the received baseband signal into RF signal that can be sent to the mobile phone 130. The RF module 220 may include a mixer to generate a new frequency according to the input signal, and the signal output from a local oscillator. The MODEM 230 may implement Gaussian Frequency Shift Keying (GFSK), $\pi/4$-Differential Quadrature Phase Shift Keying (DQPSK), 8-Differential Phase Shift Keying (DPSK), or others.

Figure 3:
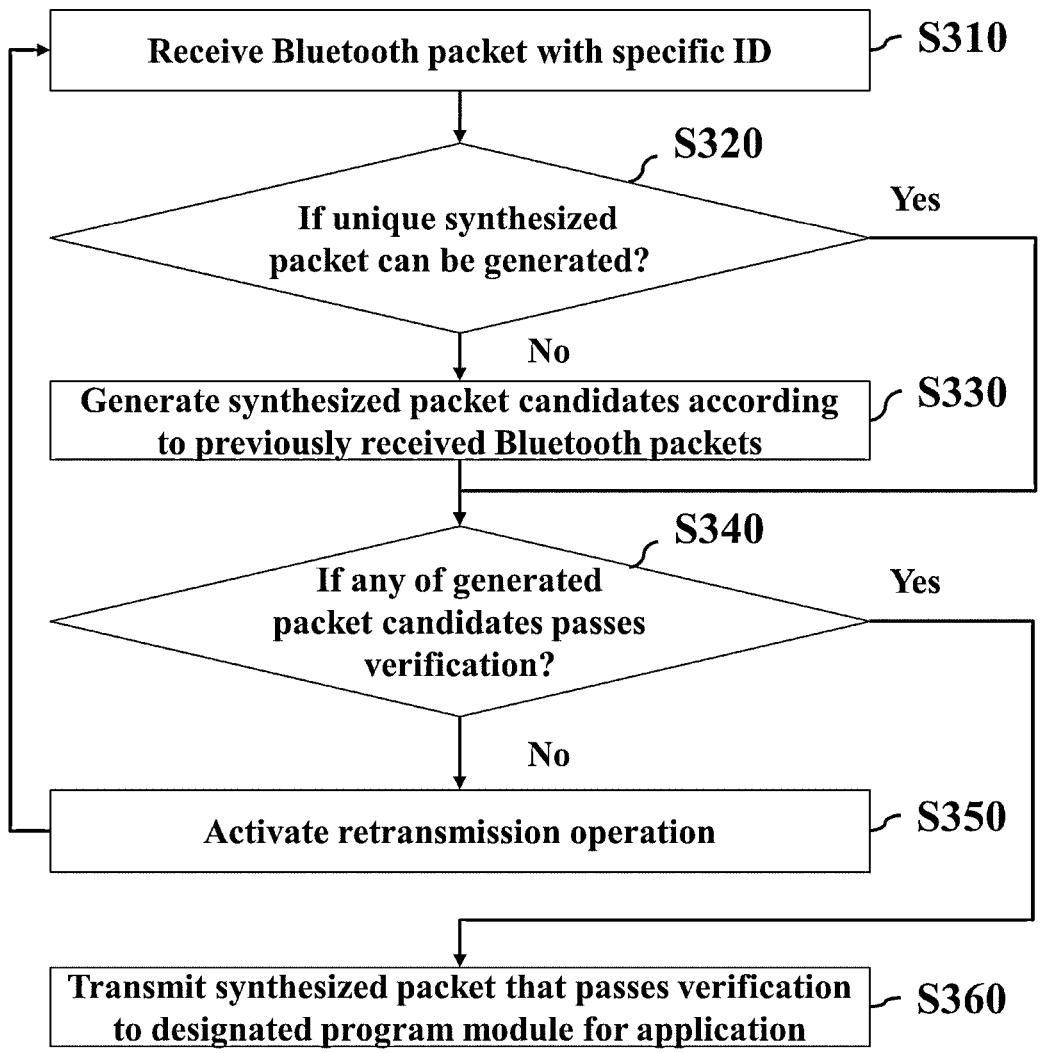
FIG. 3 is a flowchart of a method for receiving Bluetooth packets and correcting error bits therein according to an embodiment of the present invention.

Although the retransmission mechanism is used in the Bluetooth communications protocol to allow a transmitter to retransmit the packet data to a receiver when the packet data fails to pass the verification, it would consume time and bandwidth for each retransmission. Therefore, the embodiments of the present invention introduce a method for receiving Bluetooth packets and correcting error bits therein, which is performed by the processing unit 242 in the Bluetooth apparatus (such as, the mobile phone 130, the left wireless earbud 110, the right wireless earbud 120, etc.) when loading and executing relevant firmware, to reduce the number of retransmissions and improve the success rate of data reception. It is to be noted that the method is activated on the premise that the connection between the transmitter and the receiver is configured as that each retransmitted Bluetooth packet is the same as the original Bluetooth packet, and the lengths of Bluetooth packets are kept the same. Refer to detailed steps as shown in FIG. 3:

Step S310: The Bluetooth packet with the specific identifier (ID) (unless otherwise specified, the following steps are referred to as the Bluetooth packet) is received from the transmitter through the reception path in the antenna 210, the RF module 220 and the MODEM 230. The Bluetooth packet contains at least packet data (payload) and checksum. Checksum, such as Cyclical Redundancy Check (CRC) code, MD5, etc, includes redundant bits generated according to the packet data. It is to be noted that the Bluetooth packet may be the original Bluetooth packet transmitted by the transmitter for the first time, or the Bluetooth packet retransmitted by the transmitter.

Step S320: It is determined whether the unique synthesized packet can be generated from the previously received Bluetooth packets. If so, the process proceeds to step S340. Otherwise, the process proceeds to step S330. The processing unit 242 may determine whether the unique synthesized packet can be generated by performing the majority decision on inconsistent bits between the previously received Bluetooth packets. For example, if only the $10^{th}$ bits in the received three Bluetooth packets are inconsistent (specifically, the $10^{th}$ bit of the Bluetooth packet received for the first time is "1", the $10^{th}$ bit of the Bluetooth packet received for the second time is "0", and the $10^{th}$ bit of the Bluetooth packet received for the third time is "1"), then the unique synthesized packet including the $10^{th}$ bit being "1" is generated according to the majority decision.

Step S330: Multiple synthesized packet candidates are generated according to inconsistent bits among the previously received Bluetooth packets to represent all possible combinations of the inconsistent bits among them.

Step S340: It is determined whether any of the generated synthesized packet candidates passes the verification. If so, the process proceeds to step S360. Otherwise, the process proceeds to step S350. The processing unit 242 may determine whether the payload in a Bluetooth packet passes the verification according to the checksum carried in the Bluetooth packet.

Step S350: A retransmission operation is activated. For example, a negative acknowledgement (NAK) corresponding to the Bluetooth packet received in step S310 is replied to, or a re-transmission request including the specific ID is transmitted to the transmitter through the transmission path in the antenna 210, the RF module 220 and the MODEM 230.

Step S360: The synthesized packet that passes the verification is transmitted to the program module for the designated application and the designated application may be the file-data processing, the speech data processing, the man-machine interface control, etc.

Figure 4:
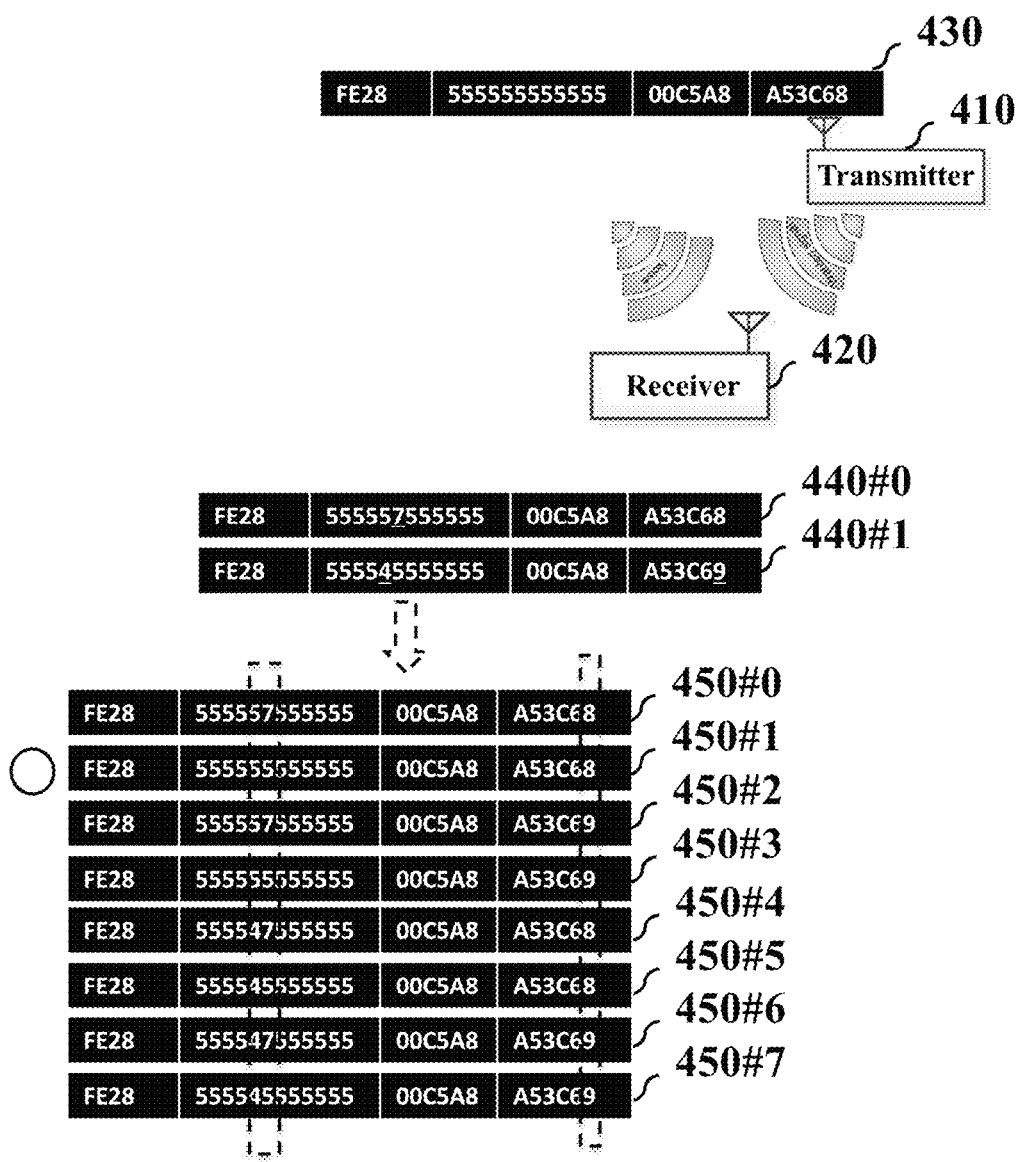
FIG. 4 is a schematic diagram for generating and verifying synthesized packet candidates according to an embodiment of the present invention.

Several use cases are listed below to explain the above method. With reference to the use case shown in FIG. 4, the transmitter 410 transmits the Bluetooth packet "0xFE28 555555555555 00C5AB A53C68" 430 to the receiver 420 at the time point to, in which "0xFE28" represents the packet header, "0x555555555555" represents the payload, "0x00C5AB" represents the Message Integrated Check (MIC) and "0xA53C68" represents the checksum. However, due to the noise interference, the receiver 420 receives the wrong Bluetooth packet "0xFE28 555557555555 00C5AB A53C68" 440 #0 at the time point t0, in which the wrong number is labeled with underline format (step S310), so that the wrong Bluetooth packet fails to pass the verification ("No" path in step S340), and a retransmission operation is activated (step S350). The transmitter 410 retransmits the Bluetooth packet "0xFE28 555555555555 00C5AB A53C68" 430 to the receiver 420 at the time point t1. However, due to the noise interference, the receiver 420 still receives the wrong Bluetooth packet "0xFE28 555545555555 00C5AB A53C69" 440 #1 at the time point t1, in which the wrong numbers are labeled with underline format (step S310). Since the previously received Bluetooth packets 440 #0 and 440 #1 cannot be used to generate the unique synthesized packet ("No" path in step S320), eight synthesized packet candidates 450 #0 to 450 #7 are generated according to the previously received Bluetooth packets 440 #0 and 440 #1 to represent all possible combinations of the inconsistent bits among the previously received Bluetooth packets 440 #0 and 440 #1 (step S330). The eight synthesized packet candidates 450 #0 to 450 #7 are verified (step S340).

Moreover, the numbers of the Bluetooth packets 440 #0 and 440 #1 are different in the least significant four bits, which are "0x8" and "0x9", respectively. "0x8" is equivalent to "2b1000" and "0x9" is equivalent to "2b1001". All possible combinations for the above inconsistent bit are "2b1000" and "2b1001", so that all possible numbers for the above inconsistent bit are "0x8" and "0x9".

Similarly, the Bluetooth packets 440 #0 and 440 #1 are different in the $19^{th}$ hex numbers, which are "0x7" and "0x5", respectively. "0x7" is equivalent to "2b0111" and "0x5" is equivalent to "2b0101". All possible combinations for the above inconsistent bit are "2b0111" and "2b0101", so that all possible numbers for the above inconsistent bit are "0x7" and "0x5".

Similarly, the Bluetooth packets 440 #0 and 440 #1 are different in the $20^{th}$ hex numbers, which are "0x5" and "0x4", respectively. "0x5" is equivalent to "2b0101" and "0x4" is equivalent to "2b0100". All possible combinations for the above inconsistent bit are "2b0101" and "2b0100", so that all possible numbers for the above inconsistent bit are "0x5" and "0x4".

In the verification, it is found that the synthesized packet candidate 450 #1 can pass the verification ("Yes" path in step S340), so the synthesized packet candidate 450 #1 is sent to the program module for the designated application (step S360).

Figure 5:
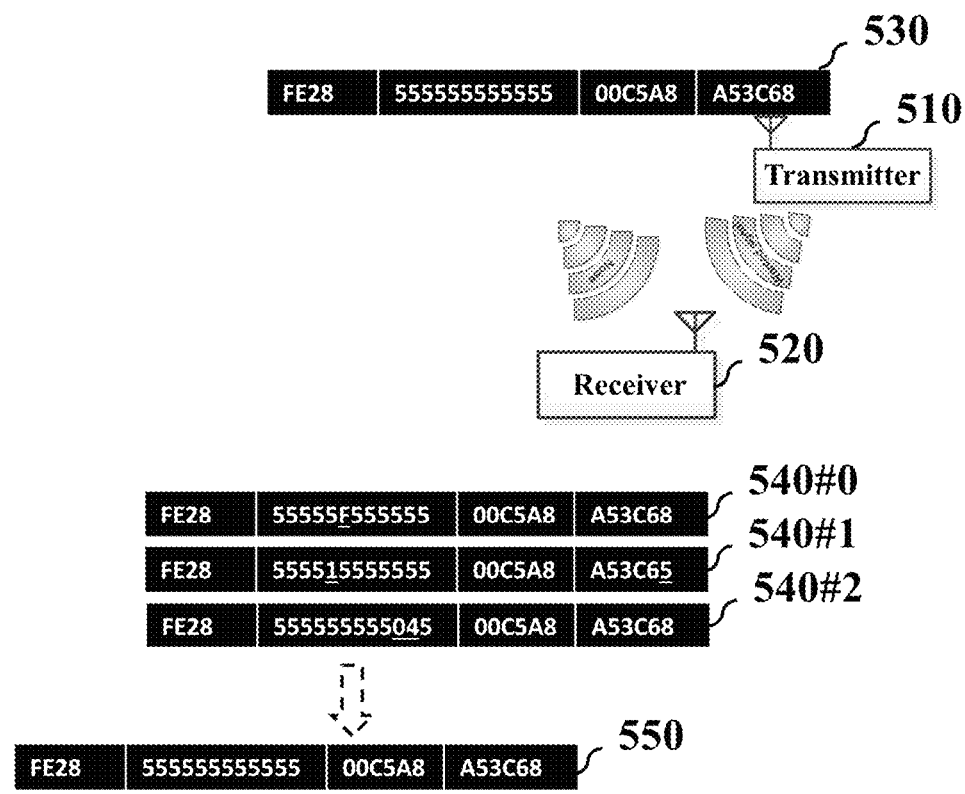
FIG. 5 is a schematic diagram for generating and verifying the unique synthesized packet according to an embodiment of the present invention.

With reference to the use case shown in FIG. 5, the transmitter 510 transmits the Bluetooth packet "0xFE28 555555555555 00C5AB A53C68" 530 to the receiver 520 at the time point t0. However, due to the noise interference, the receiver 520 receives the wrong Bluetooth packet "0xFE28 55555F555555 00C5AB A53C68" 540 #0 at the time point t0, in which the wrong number is labeled with underline format (step S310), so that the wrong Bluetooth packet fails to pass the verification ("No" path in step S340), and a retransmission operation is activated (step S350). The transmitter 510 retransmits the Bluetooth packet "0xFE28 555555555555 00C5AB A53C68" 530 to the receiver 520 at the time points t1 and t2. However, due to the noise interference, the receiver 520 still receives the wrong Bluetooth packet "0xFE28 555515555555 00C5AB A53C65" 540 #1 at the time point t1 and the wrong Bluetooth packet "0xFE28 555555555045 00C5AB A53C68" 540 #2 at the time point t2, in which the wrong numbers are labeled with underline format (step S310). Since the previously received Bluetooth packets 540 #0, 540 #1 and 540 #2 can be used to generate the unique synthesized packet "0xFE28 555555555555 00C5AB A53C68" 550 ("Yes" path in step S320). It is found that the unique synthesized packet 550 can pass the verification ("Yes" path in step S340), thus the unique synthesized packet 550 is sent to the program module for the designated application (step S360).

It is to be understood from the use case as shown in FIG. 5 that whether there is a wrong number is evaluated by comparing the numbers of a plurality of Bluetooth packets one by one. For example, it finds that the least significant hex "0x5" in the Bluetooth packet 540 #1 is different from the least significant hex "0x8" in the Bluetooth packets 540 #0 and 540 #2 by comparing the Bluetooth packets 540 #0 with the retransmitted Bluetooth packets 540 #1 and 540 #2. That is, to ensure that each number in the Bluetooth packet 54 #0 can be compared with each number in the retransmitted Bluetooth packet 540 #1, the length of the retransmitted Bluetooth packet 540 #1 would be the same as the length of the Bluetooth packet 540 #0. In the same way, the length of the retransmitted Bluetooth packet 540 #2 would be the same as the length of the Bluetooth packet 540 #4.

The above method for receiving Bluetooth packets and correcting error bits therein could be applied to the LE audio standard. In some embodiments, the mobile phone 130 may establish different connection-oriented isochronous channels with the left wireless earbud 110 and the right wireless earbud 120, respectively, and each channel uses the LE Connected Isochronous Stream (LE-CIS) logical transport and supports bi-directional communication. The two CISs form a connected isochronous group (CIG) and each CIS has multiple CIS instances. Within the CIG, and for each CIS, transmission (TX) and reception (RX) time slots are scheduled, referred to as events and subevents. The CIS instances in the same CIG have common timing reference data, which is used in the synchronization of isochronous data processing by the left wireless earbud 110 and the right wireless earbud 120. Each event occurs with a regular interval, called the ISO interval, which may be set in the range from 5 ms to 4 s in multiple of 1.25 ms. Each event is divided into one or more subevents. Each subevent contains a TX slot and a RX slot. During each subevent in a CIS, the mobile phone 130 may transmit a media packet to the left wireless earbud 110 or the right wireless earbud 120 in a TX slot and the left wireless earbud 110 or the right wireless earbud 120 may reply with a response packet to the mobile phone 130 in a RX slot. The media packet may indicate a packet including a link layer data protocol data unit (LL data PDU) for carrying left-channel or right-channel data. The response packet may be an empty packet including information of acknowledgement (ACK) or negative-acknowledgement (NAK). When receiving a NAK from the left wireless earbud 110 or the right wireless earbud 120, the mobile phone 130 may retransmit the corresponding media packet. For example, in a subevent, when the mobile phone 130 finds that the next expected sequence number (NESN) in the response packet is equal to the sequence number (SN) in the media packet that has been sent to a receiver, it means that the response packet includes a NAK. The mobile phone 130 retransmits the media packet in the next subevent. Otherwise, it means that the response packet includes an ACK, and the media packet does not need to be retransmitted.

During an establishment for a CIS connection, the mobile phone 130 may send LL CIS requests (LL_CIS_REQ) to the left wireless earbud 110 and the right wireless earbud 120, in which the control data (CtrData) field includes 1 bit of the framed parameter. The framed parameter being set to "0" indicates that the CIS connection is used to transmit unframed data packet data units (PDUs). The framed parameter being set to "1" indicates that the CIS connection is used to transmit framed data PDUs. After receiving the LL_CIS_REQ, the left wireless earbud 110 or the right wireless earbud 120 sends an LL CIS response (LL_CIS_RSP) to the mobile phone 130. The processing unit 242 of the left wireless earbud 110 or the right wireless earbud 120 knows that the lengths of Bluetooth packets transmitted over the CIS connection by the mobile phone 130 are fixed, and activates the above method for receiving Bluetooth packets and correcting error bits therein when detecting that the framed parameter in the LL_CIS_REQ is set to "0".

In alternative embodiments, the mobile phone 130 may establish a connectionless isochronous channel with the left wireless earbud 110 and the right wireless earbud 120, and the channel uses two LE Broadcast Isochronous Stream (LE-BIS) logical transports and supports uni-directional communication. The two BISs form a broadcast isochronous group (BIG), and each BIS has multiple BIS instances. The BIS instances in the same BIG have common timing reference data, which is used in the synchronization of broadcast isochronous data processing by the left wireless earbud 110 and the right wireless earbud 120. Each BIS may be used by multiple wireless receivers. Each BIS instance has its unique access address and uses the designated channel map to transmit media packets. For each BIS, TX time slots are scheduled, referred to as events and subevents. Each event occurs with a regular ISO interval. Each event is divided into one or more subevents. Each subevent contains one TX time slot. Taking the mobile phone 130 as an example, during each subevent in a BIS, the mobile phone 130 may transmit a media packet to the left wireless earbud 110 or the right wireless earbud 120 in a TX time slot of the mobile phone 130. In addition, the retransmission number (RTN) is set for each BIS. For example, when RTN=1, it means that each media packet will be retransmitted once.

During an establishment for a BIG broadcast, the mobile phone 130 may send multiple sets of BIS and the periodic advertising packet including BIG transmission information (BIGInfo), and BIGInfo includes 1 bit of the framing parameter. The framing parameter being set to "0" indicates that the BIS connection is used to transmit unframed data PDUs. The framing parameter being set to "1" indicates that the BIS connection is used to transmit framed data PDUs. The processing unit 242 of the left wireless earbud 110 or the right wireless earbud 120 knows that the lengths of Bluetooth packets transmitted over the BIS connection by the mobile phone 130 are fixed, and activates the above method for receiving Bluetooth packets and correcting error bits therein when detecting that the framing parameter in the command for establishing BIG is set to "0".

Figure 6:
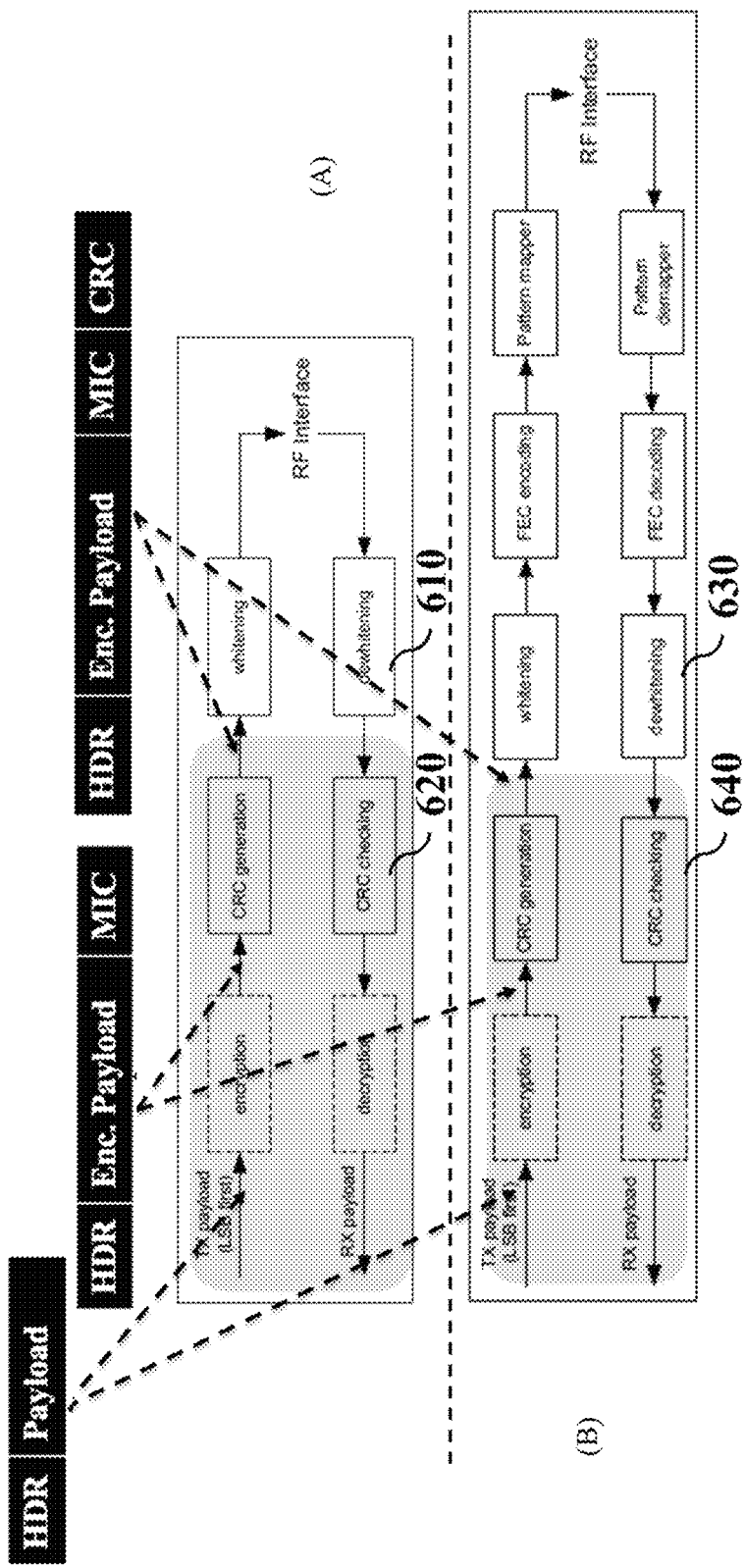
FIG. 6 are schematic diagrams showing the payload bit processes in the LE uncoded and coded PHYs according to an embodiment of the present invention.

Part (A) in FIG. 6 (the upper half) shows the payload bit process in the LE uncoded PHYs. The transmitter generates the packet header (denoted as "HDR") and the payload (denoted as "Payload") of the Bluetooth packet, and encrypts the packet header and the payload to generate the Message Integrated Check (denoted as "MIC") and the encrypted payload (denoted as "Enc. Payload"), respectively. Next, the transmitter encodes the packet header, the encrypted payload and MIC of the Bluetooth packet to generate Cyclical Redundancy Check (CRC), and encapsulates the encoded result (denoted as "CRC") into the Bluetooth packet. After dewhitening 610, the receiver theoretically obtains the above Bluetooth packet sent from the transmitter. The receiver performs CRC checking 620 to verify whether the reception result is correct. The aforementioned method for receiving Bluetooth packets and correcting error bits therein may be integrated into the process of CRC checking 620, or executed between the dewhitening 610 and the CRC checking 620. If the received Bluetooth packet cannot pass the CRC checking, then the retransmission operation is performed.

In certain Bluetooth communications standards, even if a payload in a retransmitted Bluetooth packet is identical to a payload in an original Bluetooth packet, the retransmitted Bluetooth packet may be different from the original Bluetooth packet. One possible reason is that at a transmitter side, as depicted, an encryption is prior to CRC generation. As such, in a case where the same payload is encrypted by blending different information (e.g. timing information) to in turn generate the original Bluetooth packet and the retransmitted Bluetooth packet, the original and retransmitted Bluetooth packets are different from each other although the original and retransmitted Bluetooth packets have the same payload. Therefore, at a receiver side, even if it is not interfered by noise, prior to decryption, the retransmitted Bluetooth packet is inherently different from the original Bluetooth packet because of timing information difference. Since the aforementioned method is applied to a Bluetooth pack which has not be decrypted, even if the aforementioned method is activated, the correct synthesized packet may not be successfully generated. As a result, in such case, there is no need to activate the aforementioned method.

Part (B) in FIG. 6 (the lower half) shows the payload bit process in the LE coded PHYs. Similarly, the aforementioned method for receiving Bluetooth packets and correcting error bits therein may be integrated into the process of CRC checking 640, or executed between the dewhitening 630 and the CRC checking 640. Technical details of the payload bit process as shown in FIG. 6 may refer to the *Bluetooth Core Specification* v5.2, Vol 6, Part B, Chapter 3, published on Dec. 31, 2019.

The aforementioned method for receiving Bluetooth packets and correcting error bits therein could be applied to the Basic Rate (BR)/Enhance Data Rate (EDR), which is the first/second generation of Bluetooth communications standard. The mobile phone 130 may establishes Synchronous Connection Oriented (SCO)/enhanced Synchronous Connection Oriented (eSCO) links with the left wireless earbud 110 and the right wireless earbud 120. The SCO/eSCO link is a symmetric, point-to-point link between the mobile phone 130 and the left wireless earbud 110 or the right wireless earbud 120. For example, the mobile phone 130 maintains the eSCO link by using reserved slots at regular intervals. The mobile phone 130 sends packets at regular intervals depending on packet type used for transmission, for example, 2 to 8 slots in every 12 time slots for 2-EV3 packets, where each slot is 625 μs typically. The eSCO link provides a limited number of retransmissions. For a detailed example, the mobile phone 130 may transmit a 2-EV3 packet (which may be referred to as a media packet) carrying mono data to the connected device in the first time slot. The connected device transmits a 2-EV3 packet (which may be referred to as a response packet) carrying ACK or NAK information to the mobile phone 130 in the second time slot. When receiving NAK information from the connected device, the mobile phone 130 retransmits the media packet to the connected device in the third time slot. The first to second time slots may be referred to as the eSCO window and the third to fourth time slots may be referred to as a retransmission window. After determining the modulation mode and the encryption/decryption method between the master device and the slave device during the connection establishment, the processing unit 242 in the left wireless earbud 110 or the right wireless earbud 120 knows that the lengths of Bluetooth packets transmitted over the SCO/eSCO link are fixed, and activates the above method for receiving Bluetooth packets and correcting error bits therein.

Figure 7:
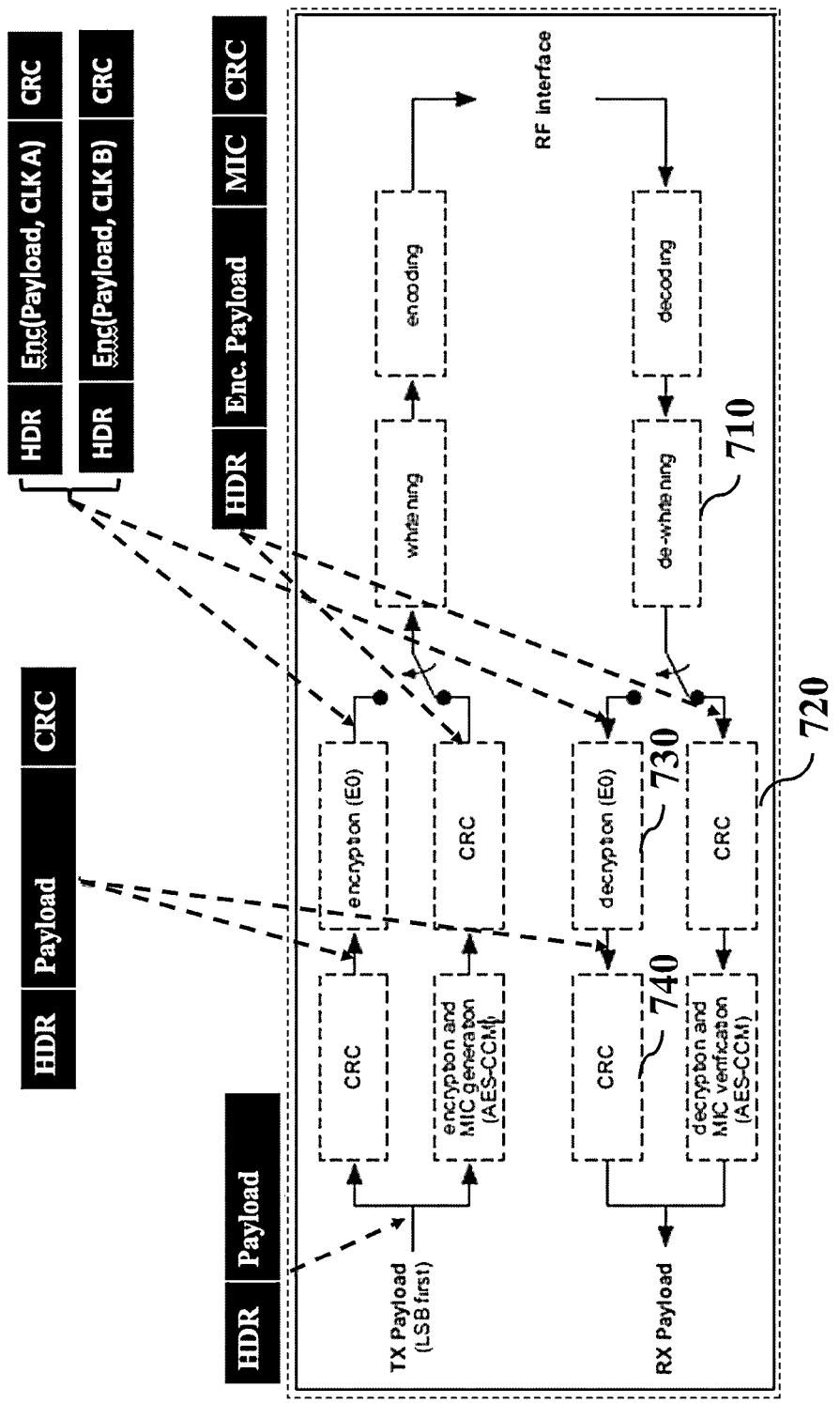
FIG. 7 is a schematic diagrams showing the payload bit processes in the Basic Rate/Enhanced Data Rate (BR/EDR) according to an embodiment of the present invention.

FIG. 7 shows the payload bit process in the BR/EDR. The communication between the transmitter and the receiver may be encrypted by the E0 or AES-CCM algorithm. When E0 is used in encryption, the transmitter generates the packet header (denoted as "HDR") and the payload (denoted as "Payload") of the Bluetooth packet, encodes the packet header and the payload of the Bluetooth packet to generate CRC, and encapsulates the encoded result (denoted as "CRC") into the Bluetooth packet. Next, the transmitter encrypts the payload using the E0 algorithm, in which the key is blended into time information, and replaces the original payload with the encrypted result (denoted as "Enc (Payload, CLK A)"). Next, after dewhitening 710 and decrypting 730 with the E0 algorithm, the receiver theoretically obtains the unencrypted Bluetooth packet as described above, which is generated by the transmitter. The receiver performs CRC checking 740 to verify whether the reception result is correct. The aforementioned method for receiving Bluetooth packets and correcting error bits therein may be integrated into the process of CRC checking 740, or executed between the decrypting 730 with the E0 algorithm and the CRC checking 740.

In the scenario of using E0 encryption, compared to the part (B) of FIG. 6 (the lower half), although the CRC checking 740 is set after the decrypting 730, the above method for receiving Bluetooth packets and correcting error bits therein can be effectively used when it ensures that there is no substantial difference between the retransmitted Bluetooth packet and the original Bluetooth packet.

When AES-CCM is used in encryption, the transmitter generates the packet header (denoted as "HDR") and the payload (denoted as "Payload") of the Bluetooth packet, and encrypts packet header and the payload to generate the Message Integrated Check (denoted as "MIC") and the encrypted payload (denoted as "Enc. Payload"), respectively. Next, the transmitter encodes the packet header, the encrypted payload and the MIC of the Bluetooth packet to generate CRC, and encapsulates the encoded result (denoted as "CRC") into the Bluetooth packet. After dewhitening 710, the receiver theoretically obtains the Bluetooth packet that are undergone the encryption with the AES-CCM algorithm as described above, which is generated by the transmitter. The receiver performs CRC checking 720 to verify whether the reception result is correct. The aforementioned method for receiving Bluetooth packets and correcting error bits therein may be integrated into the process of CRC checking 720, or executed between the dewhitening 710 and the CRC checking 720. If the received Bluetooth packet that has been encrypted cannot pass the CRC checking, then a retransmission operation is performed.

Some or all of the aforementioned embodiments of the method of the invention may be implemented in a computer program, such as a driver of a dedicated hardware, digital signal processor (DSP) code in a specific programming language, or others. Other types of programs may also be suitable, as previously explained. Since the implementation of the various embodiments of the present invention into a computer program can be achieved by the skilled person using his routine skills, such an implementation will not be discussed for reasons of brevity. The computer program implementing some or more embodiments of the method of the present invention may be stored on a suitable computer-readable data carrier such as a DVD, CD-ROM, USB stick, a hard disk, which may be located in a network server accessible via a network such as the Internet, or any other suitable carrier.

Although the embodiment has been described as having specific elements in FIG. 2, it should be noted that additional elements may be included to achieve better performance without departing from the spirit of the invention. Each element of FIG. 2 is composed of various circuits and arranged to operably perform the aforementioned operations. While the process flows described in FIG. 3 include a number of operations that appear to occur in a specific order, it should be apparent that these processes can include more or fewer operations, which can be executed serially or in parallel (e.g., using parallel processors or a multi-threading environment).

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for receiving Bluetooth packets and correcting error bits therein, performed by a processing unit, comprising:

receiving a plurality of Bluetooth packets from radio frequency (RF) signal;

verifying a unique synthesized packet with a first checksum thereof when the unique synthesized packet can be generated from the Bluetooth packets;

generating a plurality of synthesized packet candidates according to at least one inconsistent bit between the Bluetooth packets and verifying each synthesized packet candidate with a second checksum thereof when the unique synthesized packet cannot be generated from the Bluetooth packets; and transmitting a synthesized packet to a program module for an application when the unique synthesized packet or any of the synthesized packet candidates passes the verification as the synthesized packet.

2. The method of claim 1, comprising:
activating a retransmission operation when one of the verification of the unique synthesized packet and the verification of the synthesized packet candidates fails.

3. The method of claim 1, comprising:
determining whether the unique synthesized packet can be generated by performing a majority decision on the inconsistent bit between the Bluetooth packets.

4. The method of claim 1, wherein the synthesized packet candidates are used to represent all possible combinations of the inconsistent bits between the Bluetooth packets.

5. The method of claim 1, comprising:
establishing a connection-oriented isochronous channel with a transmitter, wherein the connection-oriented isochronous channel uses a logical transport of a Low Energy Connected Isochronous Stream (LE-CIS), and setting a framed parameter of the LE-CIS as an unframed data packet data unit (PDU); and
receiving the Bluetooth packets from the transmitter on the LE-CIS.

6. The method of claim 1, comprising:
establishing a connectionless isochronous channel with a transmitter, wherein the connectionless isochronous channel uses a logical transport of a Low Energy Broadcast Isochronous Stream (LE-BIS), and setting a framing parameter of the LE-BIS as an unframed data packet data unit (PDU); and
receiving the Bluetooth packets from the transmitter on the LE-BIS.

7. The method of claim 1, comprising:
establishing a synchronous connection oriented (SCO)/enhanced synchronous connection oriented (eSCO) link with a transmitter; and
receiving the Bluetooth packets from the transmitter on the SCO/eSCO link.

8. A non-transitory computer-readable storage medium having stored therein program code that, when loaded and executed by a processing unit, cause the processing unit to perform a method of receiving Bluetooth packets and correcting error bits therein to:
receive a plurality of Bluetooth packets from radio frequency (RF) signal;
verify a unique synthesized packet with a first checksum thereof when the unique synthesized packet can be generated from the Bluetooth packets;
generate a plurality of synthesized packet candidates according to at least one inconsistent bit between the Bluetooth packets and verify each synthesized packet candidate with a second checksum thereof when the unique synthesized packet cannot be generated from the Bluetooth packets; and
transmit a synthesized packet to a program module for an application when the unique synthesized packet or any of the synthesized packet candidates passes the verification as the synthesized packet.

9. The non-transitory computer-readable storage medium of claim 8, comprising program code to:
activate a retransmission operation when one of the verification of the unique synthesized packet and the verification of the synthesized packet candidates fails.

10. The non-transitory computer-readable storage medium of claim 8, comprising program code to:
determine whether the unique synthesized packet can be generated by performing a majority decision on the inconsistent bit between the Bluetooth packets.

11. The non-transitory computer-readable storage medium of claim 8, wherein the synthesized packet candidates are used to represent all possible combinations of the inconsistent bits between the Bluetooth packets.

12. The non-transitory computer-readable storage medium of claim 8, comprising program code to:
establish a connection-oriented isochronous channel with a transmitter, wherein the connection-oriented isochronous channel uses a logical transport of a Low Energy Connected Isochronous Stream (LE-CIS), and set a framed parameter of the LE-CIS as an unframed data packet data unit (PDU); and
receive the Bluetooth packets from the transmitter on the LE-CIS.

13. The non-transitory computer-readable storage medium of claim 8, comprising program code to:
establish a connectionless isochronous channel with a transmitter, wherein the connectionless isochronous channel uses a logical transport of a Low Energy Broadcast Isochronous Stream (LE-BIS), and set a framing parameter of the LE-BIS as an unframed data packet data unit (PDU); and
receive the Bluetooth packets from the transmitter on the LE-BIS.

14. The non-transitory computer-readable storage medium of claim 8, comprising program code to:
establish a synchronous connection oriented (SCO)/enhanced synchronous connection oriented (eSCO) link with a transmitter; and
receive the Bluetooth packets from the transmitter on the SCO/eSCO link.

15. An apparatus for receiving Bluetooth packets and correcting error bits therein, comprising:
a processing unit, arranged operably to: receive a plurality of Bluetooth packets from radio frequency (RF) signal through a RF module and a modulator-demodulator (modem); verify a unique synthesized packet with a first checksum thereof when the unique synthesized packet can be generated from the Bluetooth packets; generate a plurality of synthesized packet candidates according to at least one inconsistent bit between the Bluetooth packets and verify each synthesized packet candidate with a second checksum thereof when the unique synthesized packet cannot be generated from the Bluetooth packets; transmit a synthesized packet to a program module for an application when the unique synthesized packet or any of the synthesized packet candidates passes the verification as the synthesized packet; and activate a retransmission operation when one of the verification of the unique synthesized packet and the verification of the synthesized packet candidates fails.

16. The apparatus of claim 15, wherein the processing unit is arranged operably to: determine whether the unique synthesized packet can be generated by performing a majority decision on the inconsistent bit between the Bluetooth packets.

17. The apparatus of claim 15, wherein the synthesized packet candidates are used to represent all possible combinations of the inconsistent bits between the Bluetooth packets.

18. The apparatus of claim 15, wherein the processing unit is arranged operably to: establish a connection-oriented isochronous channel with a transmitter through the RF module and the modem, wherein the connection-oriented isochronous channel uses a logical transport of a Low Energy Connected Isochronous Stream (LE-CIS), and set a framed parameter of the LE-CIS as an unframed data packet data unit (PDU); and receive the Bluetooth packets from the transmitter on the LE-CIS.

19. The apparatus of claim 15, wherein the processing unit is arranged operably to: establish a connectionless isochronous channel with a transmitter through the RF module and the modem, wherein the connectionless isochronous channel uses a logical transport of a Low Energy Broadcast Isochronous Stream (LE-BIS), and set a framing parameter of the LE-BIS as an unframed data packet data unit (PDU); and receive the Bluetooth packets from the transmitter on the LE-BIS.

20. The apparatus of claim 15, wherein the processing unit is arranged operably to: establish a synchronous connection oriented (SCO)/enhanced synchronous connection oriented (eSCO) with a transmitter through the RF module and the modem; and receive the Bluetooth packets from the transmitter on the SCO/eSCO link.

* * * * *